(12) United States Patent  
Itoh (10) Patent No.: US 7,348,965 B2  
(45) Date of Patent: Mar. 25, 2008

(54) COORDINATES INPUT APPARATUS HAVING DIVIDED COORDINATES INPUT SURFACE

(75) Inventor: Akihisa Itoh, Fukushima-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 649 days.

(21) Appl. No.: 10/233,927

(22) Filed: Sep. 3, 2002

(65) Prior Publication Data

US 2003/0043113 A1 Mar. 6, 2003

(30) Foreign Application Priority Data

Sep. 4, 2001 (JP) .............................. 2001-267805

(51) Int. Cl.  
*G06F 3/41* (2006.01)
(52) U.S. Cl. ...................................... 345/173; 345/157
(58) Field of Classification Search ......... 345/156–179  
See application file for complete search history.

(56) References Cited

U.S. PATENT DOCUMENTS

| | | | |
|---|---|---|---|
| 5,757,368 A * | 5/1998 | Gerpheide et al. .......... | 345/173 |
| 5,856,822 A * | 1/1999 | Du et al. ..................... | 345/173 |
| 5,880,717 A * | 3/1999 | Chan et al. .................. | 345/173 |
| 5,943,052 A | 8/1999 | Allen et al. | |
| 5,995,083 A | 11/1999 | Sato et al. | |
| 6,727,892 B1 * | 4/2004 | Murphy ....................... | 345/173 |
| 6,822,635 B2 * | 11/2004 | Shahoian et al. ........... | 345/173 |
| 2002/0093491 A1 * | 7/2002 | Gillespie et al. ............ | 345/173 |

* cited by examiner

*Primary Examiner*—David L. Lewis  
(74) *Attorney, Agent, or Firm*—Brinks Hofer Gilson & Lione (57) ABSTRACT

In a coordinates input apparatus having a coordinates input surface that is operated by a coordinates pointer, a pointing mark on a screen being moved in accordance with the operation of the coordinates pointer, the coordinates input surface is divided by boundaries into at least nine divided regions, a function switch is allocated to each of the divided regions, and a predetermined function is associated with the function switch, the predetermined function being executed when the coordinates pointer is moved from a first divided region to a second divided region across one of the boundaries.

10 Claims, 7 Drawing Sheets

COORDINATES INPUT APPARATUS HAVING DIVIDED COORDINATES INPUT SURFACE

BACKGROUND OF THE INVENTION

1. Field of the Invention

The present invention relates to coordinates input apparatuses, and more specifically to a coordinates input apparatus that facilitates dragging operation and cursor-moving operation.

2. Description of the Related Art

Generally, mice, track balls, etc. are used as pointing devices in connection to computers. Recently, pointing devices called touch pads or track pads are also used.

A touch pad or the like is used either in a form embedded in a portable personal computer or in a form externally attached to a desktop personal computer. Since the device itself need not be moved, as opposed to a mouse, the device can be comfortably operated in a limited space, for example, on a table.

When a cursor is dragged on a screen by a mouse or the like, usually, the mouse is operated so that the cursor on the screen is placed on a desired icon or the like on the screen, then a button provided on the mouse is pressed, and the then the mouse is operated with the button kept pressed so as to move the icon or the like to a desired position.

When the drag operation is performed by a known touch pad, a finger is slid on a flat coordinates input surface of a size on the order of several centimeters square, provided on the touch pad so that a cursor on the screen is placed on a desired icon or the like, then the coordinates input surface is tapped by a finger so that the touch pad enters dragging mode, and then the finger is slid on the coordinates input surface so that the desired icon or the like is moved to a desired position.

In the known touch pad, however, since the size of the coordinates input surface is limited, for example, when a desired icon or the like is moved from one end of the screen to the other end, in order to continue dragging operation when the finger has reached to an end of the coordinates input surface, the finger is once detached from the coordinates input surface and then quickly returned in contact with the coordinates input surface, for example, at a central portion thereof, and is slid again.

In such setting, time between the finger being detached and re-contacted differs from person to person. Thus, drag mode is exit in some cases, possibly causing incorrect operation.

Similarly, when a cursor is moved, operation of moving a finger to one end of the coordinates input surface, detaching the finger from the coordinates input surface and re-contacting the finger at a central portion of the coordinates input surface, and moving the finger again to the end of the coordinates input surface must be repeated, which is rather laborious.

SUMMARY OF THE INVENTION

The present invention has been made in order to overcome the problems described above, and it is an object of the present invention to provide a coordinates input apparatus with improved operability.

To this end, the present invention provides a coordinates input apparatus having a coordinates input surface that is operated by a coordinates pointer, an pointing mark on a screen being moved in accordance with operation of the coordinates pointer, wherein the coordinates input surface is divided by boundaries into at least nine divided regions, and a function switch is allocated to each of the divided regions; and a predetermined function is associated with the function switch, the predetermined function being executed when the coordinates pointer is moved from a first divided region to a second divided region across one of the boundaries.

According to the coordinates input apparatus, in which the function associated with the function switch of the second divided region is executed when the coordinates pointer crosses the boundary between the first divided region and the second divided region, the function associated with the second divided region continues operating as long as the coordinates pointer is in contact with the second divided region. Accordingly, need of detaching and re-contacting a finger, which has been required in known touch pads, is eliminated, serving to achieve improved operability.

Preferably, in the coordinates input apparatus, the predetermined function is deactivated when the coordinates pointer is detached from the second divided region., According to the coordinates input apparatus, in which the predetermined function is deactivated only by detaching the coordinates pointer from the second region, operation is simplified.

In the coordinates input apparatus, the function associated with the function switch of the second divided region may be a function of moving the pointing mark in a predetermined direction.

According to the coordinates input apparatus, the pointing mark on the screen can be moved in the predetermined direction only by moving the coordinates pointer to the second divided region.

Furthermore, in the coordinates input apparatus, the divided regions preferably include a plurality of peripheral regions adjacent to a periphery of the coordinates input surface, and at least one central regions surrounded by the peripheral regions; and the function associated with the function switch of at least one of the peripheral regions is a function of moving the pointing mark in a predetermined direction.

According to the coordinates input apparatus, only by moving the coordinates pointer to one of the peripheral regions, the pointing mark can be moved in the predetermined direction allocated to the relevant peripheral region. Accordingly, by allocating functions of moving the pointing mark in different predetermined directions respectively to the plurality of peripheral regions, the pointing mark can be continuously moved without detaching the coordinates pointer from the coordinates input surface.

In the central region, a switch for deactivating operation of the functions of the function switches allocated to the peripheral regions may be allocated.

Furthermore, preferably, in the coordinates input apparatus, when the coordinates pointer is moved in a direction that is different from the predetermined direction in the at least one of the peripheral regions, direction of movement of the pointing mark is set to a combined direction of the predetermined direction and the direction of movement of the coordinates pointer.

According to the coordinates input apparatus, in which direction of movement of the pointing mark is set to the combined direction of the predetermined direction and the direction of movement of the coordinates pointer, direction of movement of the pointing mark can be finely controlled, achieving improved operability.

DESCRIPTION OF THE PREFERRED EMBODIMENTS

Preferred embodiments of the present invention will now be described with reference to the accompanying drawings.

Figure 1:
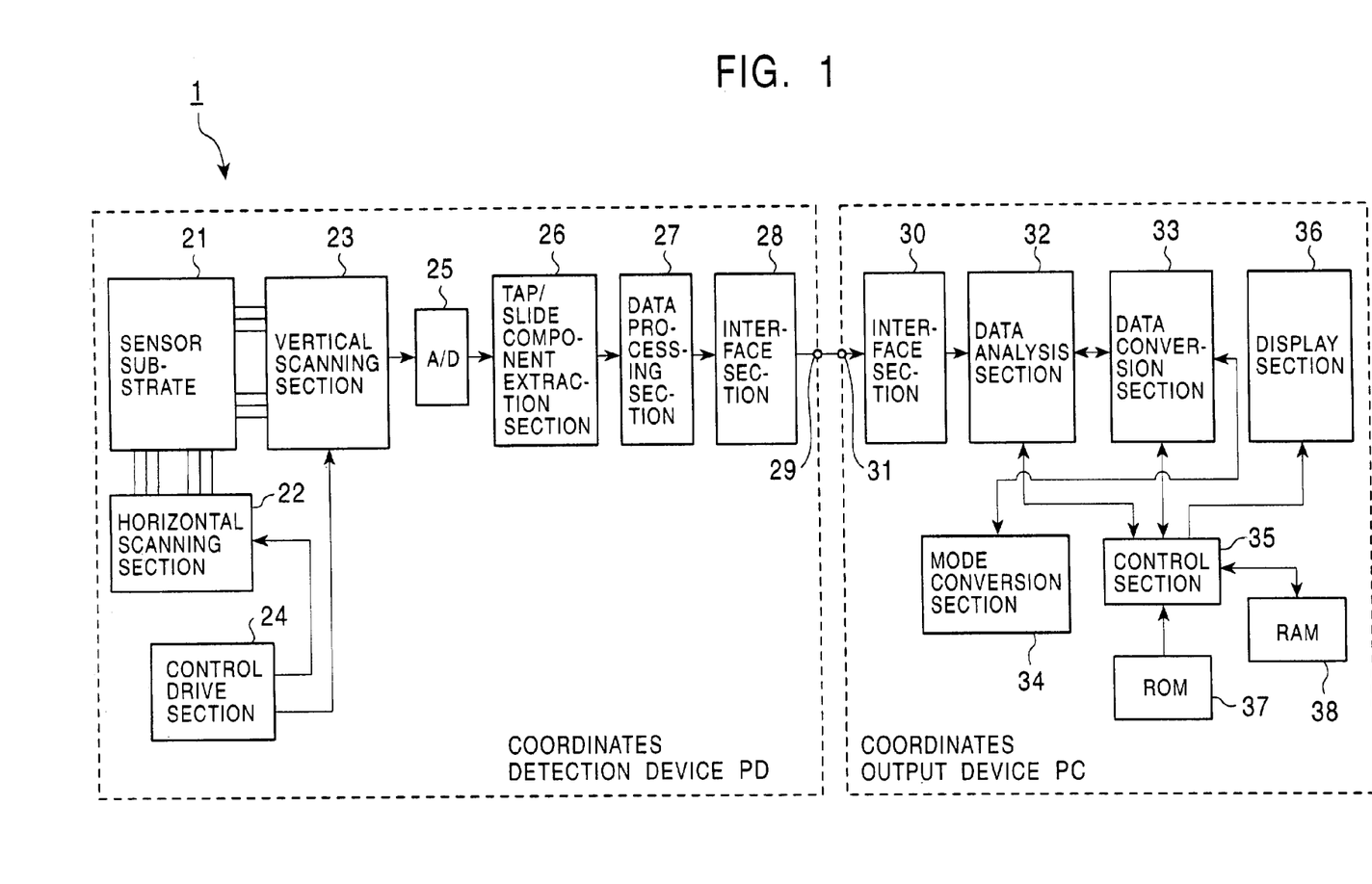
FIG. 1 is a block diagram showing the construction of a coordinates input apparatus according to an embodiment of the present invention.

FIG. 1 is a block diagram showing the construction of a coordinates input apparatus 1 according to an embodiment of the present invention. Referring to FIG. 1, the coordinates input apparatus 1 generally includes a coordinates detection device PD and a coordinates output device PC. The coordinates detection device PD is, for example, a touch pad, and the coordinates output device PC is, for example, a personal computer connected to the touch pad.

Figure 2:
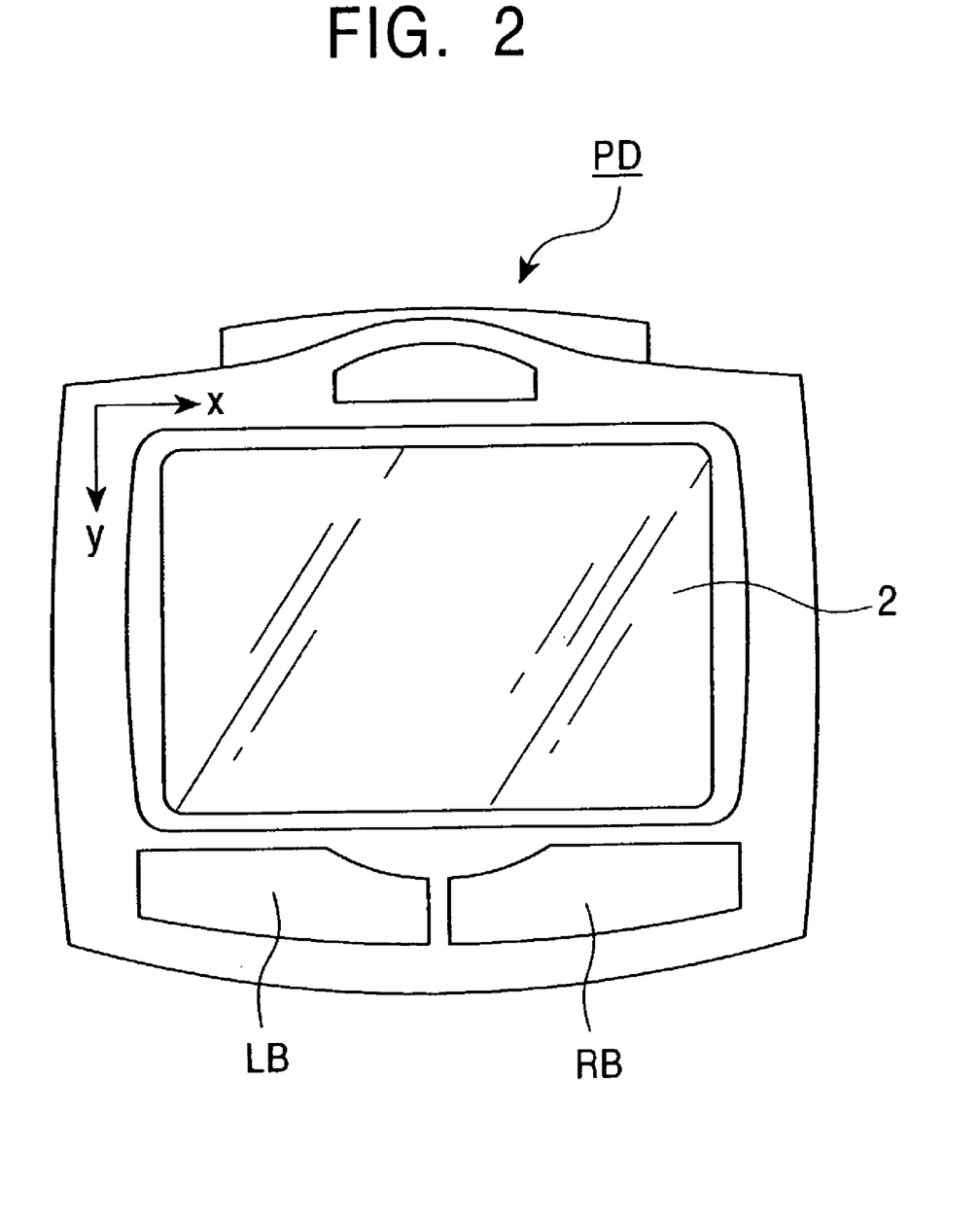
FIG. 2 is an external plan view of a coordinates detection device.

Before describing components of the coordinates detection device PD, the mechanical construction of the coordinates detection device PD will be briefly described. FIG. 2 is an external plan view of the coordinates detection device PD. Referring to FIG. 2, a left button LB and a right button RB correspond to and have the same functions as a left button and a right button of a mouse, respectively. A coordinates input surface 2 is a rectangular surface that is operated by a coordinates pointer (not shown in FIG. 2). The coordinates pointer herein refers to, for example, a finger of hand of a user, and the following description will be made in the context of the coordinates pointer being a finger.

Referring to FIG. 1, on a sensor substrate 21, a plurality of horizontal scanning lines (in the direction of X axis in FIG. 2) and a plurality of vertical scanning lines (in the direction of Y axis in FIG. 2) are arranged so as to form a matrix. When a finger touches the coordinates input surface 2 on a top surface of the sensor substrate 21, amount of current that flows through the scanning lines changes. More specifically, the coordinates detection device PD in this embodiment is of an electrostatic capacitance type, in which electrodes are arranged on either side of an electrostatic film so as to form a matrix and in which an electric field is formed by applying pulses from one end of the electrostatic film. Accordingly, when a finger touches the electrostatic film via the coordinates input surface 2, electrostatic capacitance at the touched region is reduced, and the change in electrostatic capacitance is converted into change in amount of current, whereby the position of the region touched by the finger is detected. That is, a coordinate point of the touched region is specified as an intersection of a horizontal scanning line and a vertical scanning line. By calculating change in the position of the touched region, an operation of sliding a finger over the coordinates input surface 2 can also be detected.

The touch pad need not be of an electrostatic capacitance type, and may be, for example, of a pressure sensitive type.

A horizontal scanning section 22 is a circuit for executing a horizontal scan on the sensor substrate 21, and a large number of signal outputs is connected to the horizontal scanning lines of the sensor substrate 21.

A vertical scanning section 23 is a circuit for executing a vertical scan on the sensor substrate 21, and a large number of signal outputs is connected to the vertical scanning lines of the sensor substrate 21, generating a serial detection signal representing operation status of the finger. The serial detection signal includes a tap component generated when a finger taps on the coordinates input surface 2 of the sensor substrate 21, and a slide component generated when a finger slides over the coordinates input surface 2. The tap component includes an address component representing a position tapped by the finger on the coordinates input surface 2, and the slide component includes an address component representing a starting point and an end point of a slide of the finger. A tap at a coordinate point on the input surface 2 can be distinguished from slide over a coordinate point since a tap will cause a greater change in the electrostatic capacitance and thus a greater change in the current flow.

A control drive section 24 supplies scanning drive signals, and thereby drives, to the horizontal scanning section 22 and the vertical scanning section 23.

An A/D (analog/digital) conversion section 25 converts the serial detection signals generated by the vertical scanning section 23 and the horizontal scanning section 22 into a digital signal.

A tap/slide component extraction section 26 extracts the tap component and slide component from the digitized serial detection signal, separates and converts these components into three separate dimensional coordinate values, outputting the coordinate values as component and slide component data.

A data processing section 27 determines whether a tapping has been performed based on the three separate dimensional coordinate values transferred from the tap/slide component extraction section 26. Furthermore, the data processing section 27 removes noise from the slide component, correcting change in the position of the finger on two separate dimensional coordinates of the coordinates input surface 2, defined by the X axis and the Y axis, into a smooth straight line or curved line.

An interface section 28 is a circuit for exchanging data with the coordinates output device PC. Based on information transferred from the data processing section 27, the interface section 28 adds information regarding ON/OFF of tapping and information regarding ON/OFF of each of the left button LB and the right button RB for each corrected absolute coordinates (X, Y) on the two separate dimensional coordinates of the coordinates input surface 2, outputting the information to an output port 29 together with the tap component and slide component.

Next, components of the coordinates output device PC will be described.

An interface section 30 is a circuit for exchanging data with the coordinates detection device PD. The interface section 30 receives information described above via an input port 31. In the case of the coordinates output device PC being a personal computer, the interface section 30 corresponds to a serial port or mouse port of a known type.

A data analysis section 32 analyzes the information received from the coordinates detection device PD via the interface section 30. The data analysis section 32 determines whether a tapping has been performed, whether a finger is sled in a particular region on the coordinates input surface 2, etc., reporting the results to a data conversion section 33.

Based on the information regarding tapping and slide of finger in the particular region, obtained by the analysis in the data analysis section 32, the data conversion section 33 determines whether predetermined functions are to be executed. The predetermined functions include, for example, a function of continuously moving a cursor, which will be described later in detail.

A mode conversion section 34 stores various setting values for the coordinates input apparatus 1. The data conversion section 33 changes contents of the functions based on the setting values transferred from the mode conversion section 34. As will be described later, the setting values specify a range of divided region, contents of functions respectively associated with function switches allocated to divided regions, etc. for executing the functions such as continuous movement of a cursor. The setting values can be set in the mode conversion section 34, for example, by a known operation on a menu displayed on a screen of a computer by a user.

A control section 35 is a circuit for controlling the components of the coordinates output device PC except for the interface section 30.

A display section 36 is, for example, a display of a personal computer. The display section 36 displays various images, such as a window and a cursor (pointing mark) on a screen 36' thereof according to instructions from the control section 35.

A ROM (read-only memory) 37 stores operation programs of the control section 35, a size of the coordinates input surface 2 defined by the format of absolute coordinates (X, Y) described above, etc.

A RAM (random access memory) 38 is a storage circuit for temporarily storing data when the control section 35 executes various processes.

Next, before describing operation of the coordinates input apparatus 1 according to this embodiment, for ease of understanding thereof, functions of the coordinates input apparatus 1 will be described. In the coordinates input apparatus 1 according to this embodiment, the coordinates input surface 2 is divided into a plurality of divided regions, and function switches are allocated respectively to the divided regions. When a finger is moved from a first divided region to a second divided region across a boundary therebetween, a function associated with the function switch allocated to the second divided region is executed.

The function is, for example, "continuous movement of cursor." This function continuously moves a cursor in a predetermined direction on the screen 36' even when a finger reaches the proximity of a periphery of the coordinates input surface 2 and is kept still in contact with the coordinates input surface 2.

Figure 3:
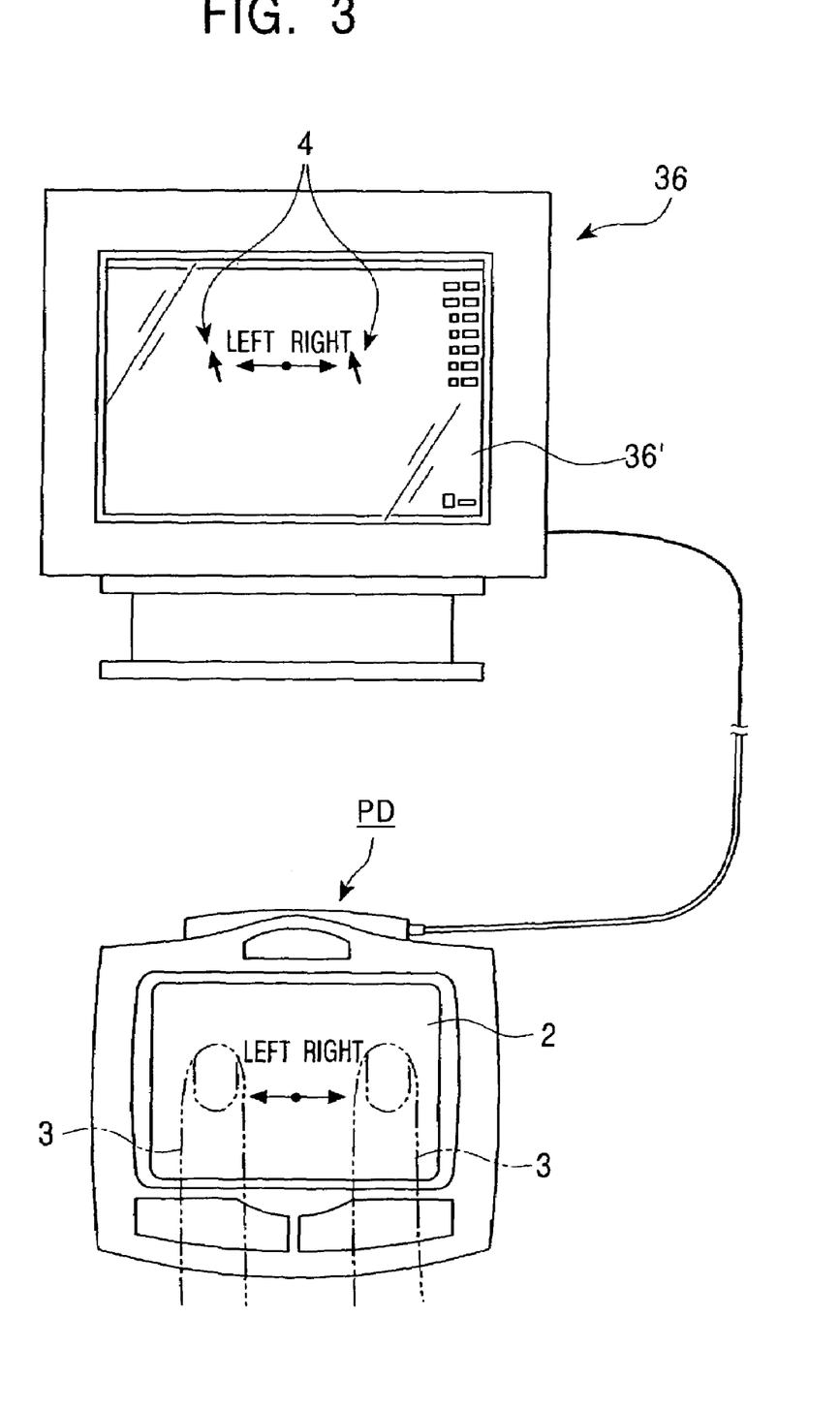
FIG. 3 is a diagram for explaining operation of a cursor in relation to the coordinates input apparatus according to the embodiment.

More specifically, as shown in FIG. 3, when a finger serving as a coordinates pointer is moved to the right or to the left, a cursor 4 on the screen 36' is moved to the right or to the left in accordance with the movement of the finger.

At this time, for example, even when the finger reaches the proximity of the right end of the coordinates input surface 2 and the sliding operation of the finger is stopped, the cursor 4 (pointing mark) on the screen 36' keeps moving to the right as long as the finger 3 is in contact with the coordinates input surface 2.

Next, various settings of the coordinates input apparatus 1 having the construction described above will be described.

Figure 4:
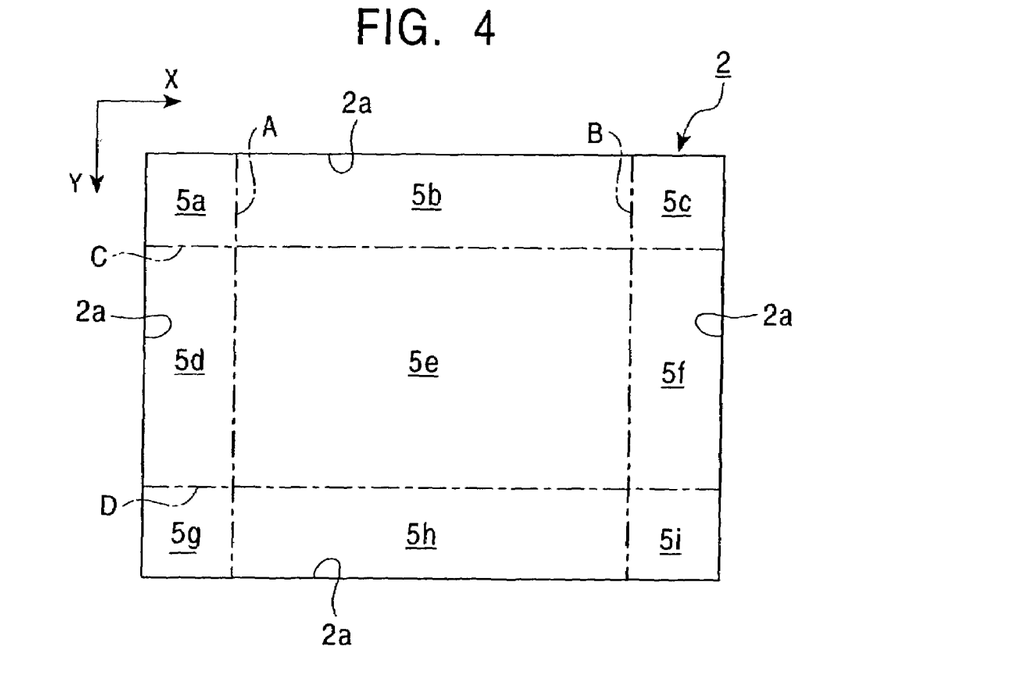
FIG. 4 is a plan view showing a first example of divided regions set in a coordinates input surface.

Settings described below are made to the coordinates output device PC. As a first setting, for example, as shown in FIG. 4, the coordinates input surface 2 is divided into nine divided regions 5a to 5i. The divided regions 5a to 5i need not necessarily be equal in size. For example, the division may be such that the divided region 5e at the center is larger and the divided regions 5a to 5d and 5f to 5i in the periphery are smaller, as shown in FIG. 4.

In this embodiment, the divided region 5e, substantially at the center of the coordinates input surface 2, will be referred to as the center region 5e, and the divided regions 5a to 5d and 5f to 5i adjacent to a periphery 2a of the coordinates input surface 2 will be referred to as the peripheral regions 5a to 5d and 5f to 5i.

Referring to FIG. 4, the central region 5e and the peripheral regions 5a to 5d and 5f to 5i are defined by boundaries A to D (indicated by dotted-chain lines). The boundaries A and B extend in the Y direction in parallel to each other, and the boundaries C and D extend in the X direction in parallel to each other. Each of the boundaries A and B crosses each of the boundaries C and D.

The ranges of the central region 5e and the peripheral regions 5a to 5d and 5f to 5i are defined by absolute coordinates (X, Y) with respect to an origin at the top left corner of the coordinates input surface 2, and is stored, for example, as a set of the absolute coordinates of the top left corner and the absolute coordinates of the bottom right corner of each region.

As a second setting, function switches are allocated to the central region 5e and the peripheral regions 5a to 5d and 5f to 5i. The function switches are respectively associated with functions of moving the cursor 4 (pointing mark) on the screen 36' in predetermined directions.

Figure 5:
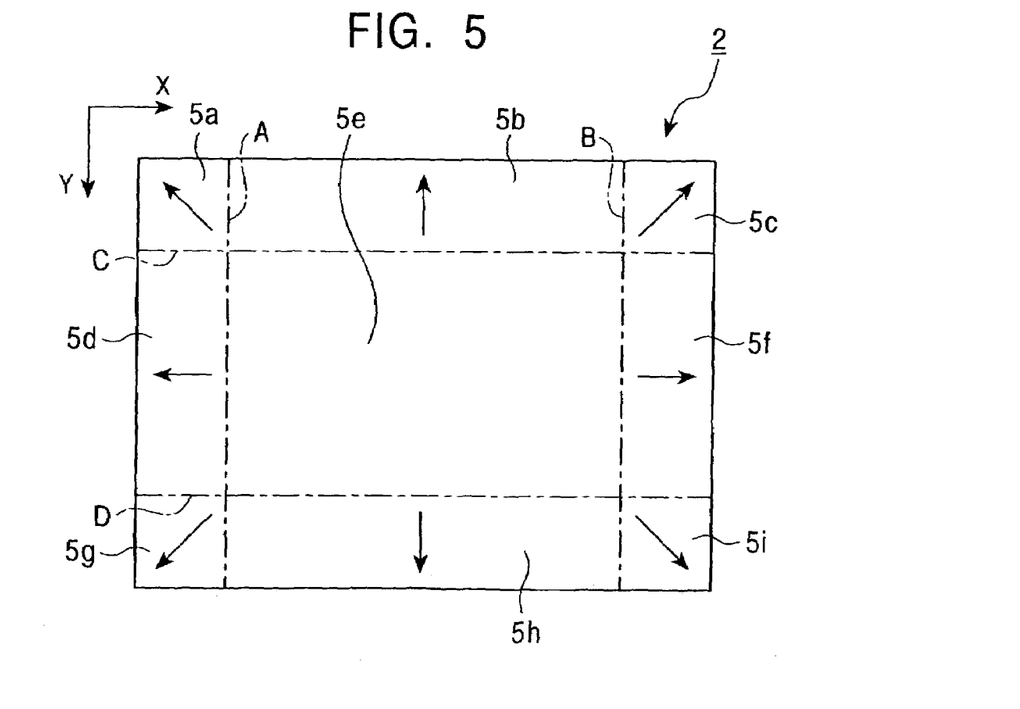
FIG. 5 is a plan view showing directions of movement of the cursor by function switches allocated to peripheral regions in relation to the first example of divided regions set in the coordinates input surface.

For example, as shown in FIG. 5, a function of moving the cursor 4 to the right (in the X direction) on the screen 36' is allocated to the function switch in the peripheral region 5f.

Similarly, functions are allocated so that the function switch of the peripheral region 5a moves the cursor 4 diagonally toward the top left, the function switch of the peripheral region 5b moves the cursor 4 upward (opposite to the Y direction), the function switch of the peripheral region 5c moves the cursor 4 diagonally to the top right, the function switch of the peripheral region 5d moves the cursor 4 to the left (opposite to the X direction), the function switch of the peripheral region 5g moves the cursor 4 diagonally toward the bottom left, the function switch of the peripheral region 5h moves the cursor 4 downward (in the Y direction), and the function switch of the peripheral region 5i moves the cursor 4 diagonally toward the bottom right. The directions of movement of the cursor 4 are indicated by arrows in the respective regions 5a to 5i in FIG. 5.

In the central region 5e, a switch for deactivating the functions associated with the function switches of the peripheral regions 5a to 5d and 5f to 5i is allocated. Thus, when the finger 3 is slid from one of the peripheral regions 5a to 5d and 5f to 5i to the central region 5e, continuous movement of the cursor 4 is stopped. When the finger 3 is moved within the central region 5e, the cursor 4 is moved in accordance with the movement of the finger 3, similarly to a known touch pad or the like.

As a third setting, operations for executing the function switches allocated to the peripheral regions 5a to 5d and 5f to 5i are set. The operations are such that when the finger 3 serving as a coordinates pointer moves from a first divided region to a second divided region that is adjacent to the first divided region across one of the boundaries A to D, the function associated with the second divided region is executed.

For example, the function switch of the peripheral region 5f is set so as to be activated when the finger 3 serving as a coordinates pointer crosses one of the boundaries B to D defining the peripheral region 5f.

More specifically, the peripheral region 5f is defined by the boundary B with the central region 5e, the boundary C with the peripheral region 5c, and the boundary D with the peripheral region 5i, and the function of moving the cursor 4 to the right is set in the peripheral region 5f. The function is activated with the finger 3 serving as a coordinates pointer is moved from the central region 5e to the peripheral region 5f across the boundary B, from the peripheral region 5c to the peripheral region 5f across the boundary C, or from the peripheral region 5i to the peripheral region 5f across the boundary D.

The function is also activated when the finger 3 is moved into the peripheral region 5f across one of the intersections of the boundaries B to D from the peripheral region 5b or the peripheral region 5h.

Similarly, the peripheral region 5a is defined by the boundary A with the peripheral region 5b and the boundary C with the peripheral region 5d. The function of moving the cursor 4 in the peripheral region 5a diagonally toward the top left is activated when the finger 3 is moved from the peripheral region 5b to the peripheral region 5a across the boundary A or from the peripheral region 5d to the peripheral region 5a across the boundary C.

The function switch in the peripheral region 5a is also activated when the finger 3 is moved from the central region 5e into the peripheral region 5a across the intersection of the boundaries A and C.

Similarly, the peripheral region 5b is defined by the boundary A with the peripheral region 5a, the boundary B with the peripheral region 5c, and the boundary C with the central region 5e. The function of moving the cursor 4 in the peripheral region 5b upward is activated when the finger 3 is moved from the peripheral region 5a to the peripheral region 5b across the boundary A, from the peripheral region 5c to the peripheral region 5b across the boundary B, or from the central region 5e to the peripheral region 5b across the boundary C.

Similarly, operations for activating the function switches allocated to the respective peripheral regions 5c, 5d, and 5g to 5i are set.

The central region 5e is defined by the boundaries A to D. When the finger 3 is moved into the central region 5e from one of the peripheral regions 5a to 5d and 5f to 5i across one of the boundaries A to D, the function switches of the peripheral regions 5a to 5d and 5f to 5i are deactivated, so that the cursor 4 moves in accordance with movement of the finger 3, similarly to a known touch pad or the like.

As a fourth setting, the function of deactivating the function switches of the peripheral regions 5a to 5d and 5f to 5i when the finger 3 serving as a coordinates pointer is detached from the peripheral regions 5a to 5d and 5f to 5i is set.

As a fifth setting, when the finger 3 serving as a coordinates pointer is moved in a direction that is different from the predetermined direction of movement of the cursor 4 in each of the peripheral regions 5a to 5d and 5f to 5i shown in FIG. 5, direction of movement of the cursor 4 is set to a combined direction of the predetermined direction of movement of the cursor 4 in the relevant peripheral region and the direction of movement of the finger 3.

Figure 6:
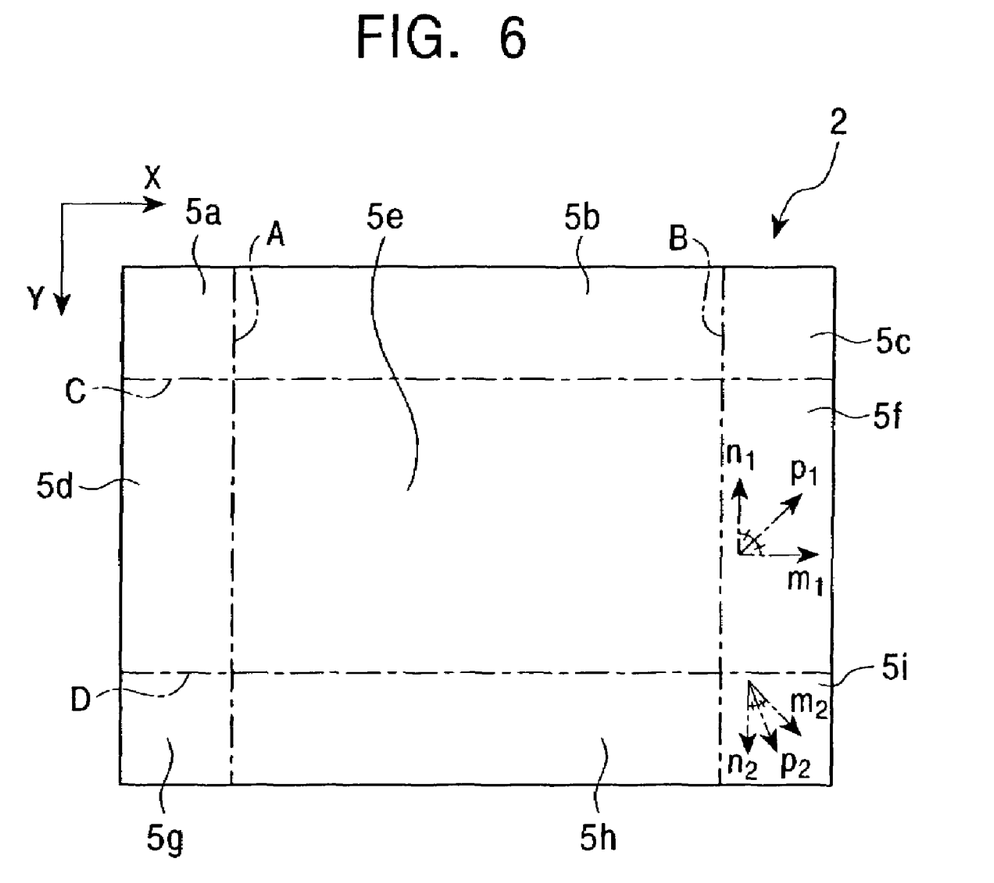
FIG. 6 is a plan view showing directions of movement of the cursor in relation to the first example of divided regions set in the coordinates input surface.

For example, with regard to the peripheral region 5f, with which the function of moving the cursor 4 to the right (indicated by an arrow m1) is associated, when the finger 3 is slid upward (indicated by an arrow n1) in the peripheral region 5f, the cursor 4 in the screen 36' is moved in the direction of an arrow p1 (diagonally to the top right), which is a combined direction of the arrows m1 and n1, as shown in FIG. 6.

With regard to the peripheral region 5i, with which the function of moving the cursor diagonally toward the bottom right is associated, when the finger 3 is slid downward (indicated by an arrow n2) in the peripheral region 5i, the cursor 4 in the screen 36' is moved in the direction of an arrow p2 (diagonally toward the bottom right), which is a combined direction of the arrows m2 and n2.

Similar settings are made to the other peripheral regions 5a to 5d, 5g, and 5h.

The first to the fifth settings may be stored as a program in the ROM 37 of the coordinates output device PC, or stored as a device driver in the RAM 38.

Next, operation of the coordinates input apparatus having the above-described construction will be described.

In the following description, it is assumed that the finger 3 is initially in contact with the central region 5e.

Figure 7:
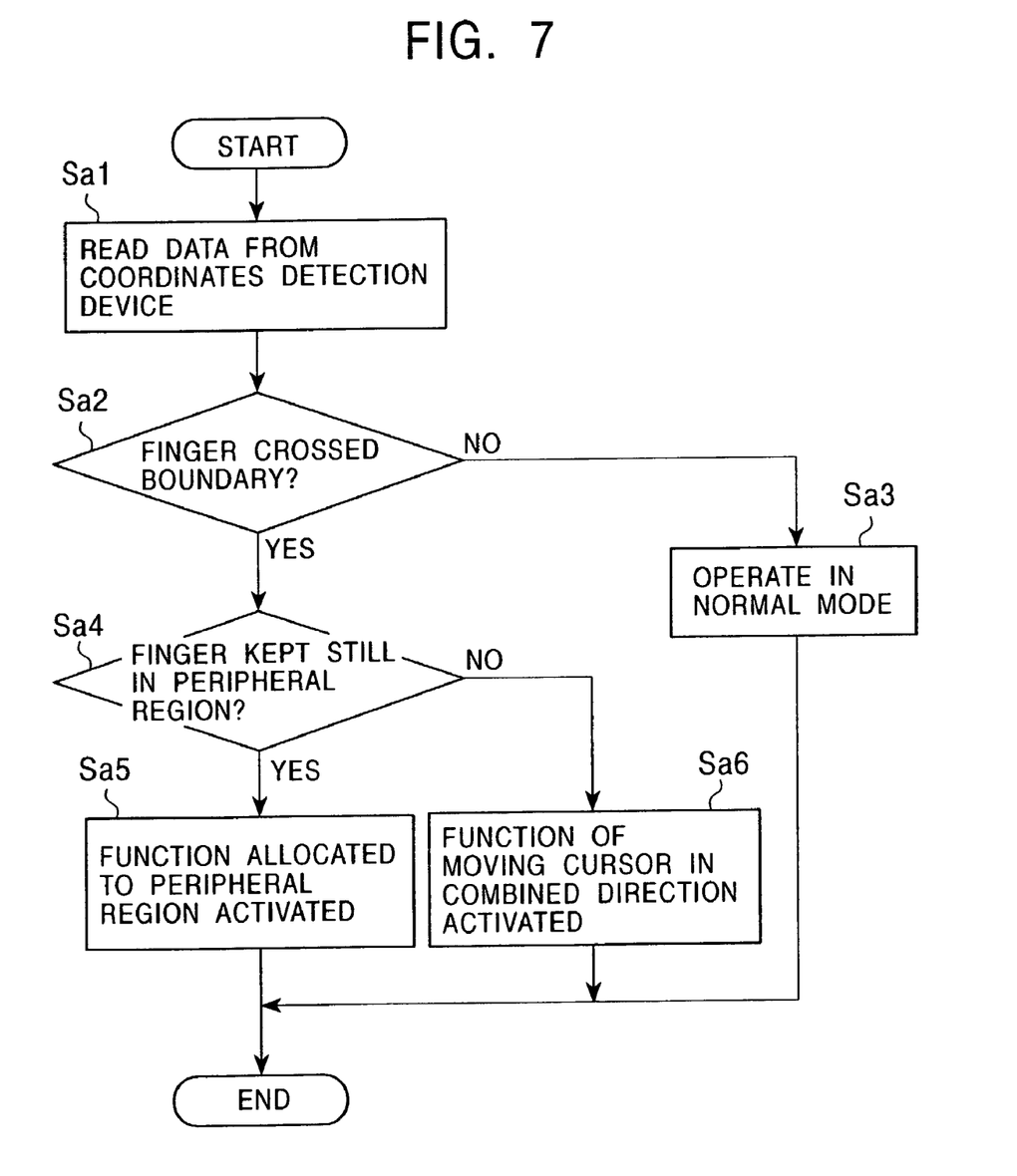
FIG. 7 is a flowchart showing operation of the coordinates input apparatus according to the embodiment.

Referring to FIG. 7, first, the coordinates output device PC obtains data from the coordinates detection device PD in step Sa1. This step will be described below with reference also to FIG. 1. In the coordinates detection device PD, the horizontal scanning section 22 and the vertical scanning section 23 are driven by a driving signal output from the drive control section 24. When a user operates a desired point on the sensor-substrate 21 (i.e., on the coordinates input surface 2) by the finger 3 while a scanning signal is being supplied to the scanning lines of the sensor substrate 21, a serial detection signal corresponding to the operation status of the finger 3 is output from the vertical scanning section 23. The A/D conversion section converts the serial detection signal into a digital signal, and the tap/slide component extraction section 26 extracts a tap component and a slide component.

The data processing section 27 transfers the tap component as it is to the interface section 28, and corrects the slide component by removing noise therefrom, transferring the result to the interface section 28. The interface section 28 generates information regarding ON/OFF of tapping and ON/OFF of buttons, adds the information to the data transferred from the data processing section 27, and supplies the result to the output port 29, which is transferred to the coordinates output device PC.

In the coordinates output device PC, the information supplied to the input port 31 is transferred to the data analysis section 32 via the interface section 30, whereby the coordinates output device PC completes obtaining data from the coordinates detection device PD. In known art, the supplied tap component and slide component are transferred to the control section 35, which converts the components into data suitable for image display, supplying the result to the display section 36. Accordingly, for example, the cursor 4 is displayed on the screen 36' of the display section 36 as moving in accordance with movement of the finger 3 operating the coordinates input surface 2.

When the coordinates input surface 2 is operated by the finger 3, the coordinates input apparatus 1 proceeds to step Sa2 in FIG. 7, in which the data analysis section 32 determines whether the finger 3 has crossed one of the boundaries A to D defining the central region Se. More specifically, the data analysis section 32 fetches absolute coordinates of the top left corner and the bottom right corner of the relevant region, stored in the mode conversion section 34. Let the absolute coordinates be denoted by (Xa, Ya) and (Xb, Yb), respectively. The data analysis section 32 determines whether the finger 3 is located in the central region 5e based on whether the absolute coordinates (X, Y) of the position of the finger 3 satisfies Xa<X<Xb and Ya<Y<Yb.

If it is determined that the finger 3 is located in the central region 5e, the coordinates input apparatus 1 proceeds to step Sa3, operating in normal mode.

More specifically, the control section 35 converts the tap component and slide component supplied from the coordinates detection device PD into data suitable for image display, supplying the data to the display section 36. Accordingly, the cursor 4 is displayed on the screen 36' of the display section 36 as moving in accordance with movement of the finger 3 operating the coordinates input surface 2.

If it is determined in step Sa2 that the finger 3 has crossed one of the boundaries A to D defining the central region 5e, the coordinates input apparatus 1 proceeds to step Sa4.

In step Sa4, it is determined whether the finger 3 is kept still in one of the peripheral regions 5a to 5d and 5f to 5i after crossing one of the boundaries A to D defining the central region 5e. If it is determined that the finger 3 is kept still, the coordinates input apparatus 1 proceeds to step Sa5.

In step Sa5, the function switch allocated to the relevant one of the peripheral regions 5a to 5d and 5f to 5i is activated.

For example, if the finger 3 is moved from the central region 5e to the peripheral region 5f across the boundary B, the function switch for moving the cursor 4 in the peripheral region 5f to the right is activated. Accordingly, the cursor 4 is displayed on the screen 36' of the display section 36 as moving rightward as long as the finger 3 is in contact with the peripheral region 5f.

If it is determined in step Sa4 that the finger 3 is not kept still in the relevant one of the peripheral regions 5a to 5d and 5f to 5i, the coordinates input apparatus 1 proceeds to step Sa6.

In step Sa6, when the finger 3 is moved in a direction that is different from the predetermined direction of movement of the cursor 4 in the relevant one of the peripheral regions 5a to 5d and 5f to 5i, direction of movement of the cursor 4 is set to a combined direction of the predetermined direction and the direction of movement of the finger 3.

For example, as shown in FIG. 6, if the finger 3 is slid upward in the peripheral region 5f, the function of moving the cursor 4 on the screen 36' in the direction of the arrow p1, which is the combined direction of the arrows m1 and n1, is activated.

In the coordinates input apparatus 1 according to this embodiment, when the finger 3 crosses one of the boundaries A to D between the central region Se and the peripheral regions 5a to 5d and 5f to 5i, the function associated with the function switch of the relevant one of the peripheral regions 5a to 5d and 5f to 5i is executed, and the function continues operating as long as the finger 3 is in contact with the relevant one of the peripheral regions 5a to 5d and 5f to 5i. Accordingly, need for once detaching and re-contacting the finger, which has been required in known touch pads, is eliminated, so that the coordinates input apparatus 1 provides improved operability.

In particular, in the coordinates input apparatus 1 described above, the function of moving the cursor 4 in predetermined directions are associated with the peripheral regions 5a to 5d and 5f to 5i, so that the cursor 4 on the screen 36' can be moved in the predetermined directions as desired only by moving the finger 3 correspondingly to the peripheral regions 5a to 5d and 5f to 5i.

Furthermore, in the coordinates input apparatus 1 described above, the functions associated with the peripheral regions 5a to 5d and 5f to 5i are deactivated only by detaching the finger 3 from the peripheral regions 5a to 5d and 5f to 5i, respectively, so that the coordinates input apparatus 1 can be operated in a simple manner.

Furthermore, in the coordinates input apparatus 1 described above, when the finger 3 is moved in a direction that is different from the predetermined direction in each of the peripheral regions 5a to 5d and 5f to 5i, direction of movement of the cursor 4 is set to a combined direction of the predetermined direction and the direction of movement of the finger 3. Accordingly, direction of movement of the cursor 4 can be finely controlled, so that the coordinates input apparatus 1 has improved operability.

The scope of the present invention is not limited to the embodiment described above, and various modifications are possible without departing from the spirit of the present invention.

For example, although the coordinates input surface 2 is divided into nine regions in the coordinates input apparatus 1 described above, the number of divided regions may be more than nine, for example, twelve, sixteen, or twenty.

Figure 8:
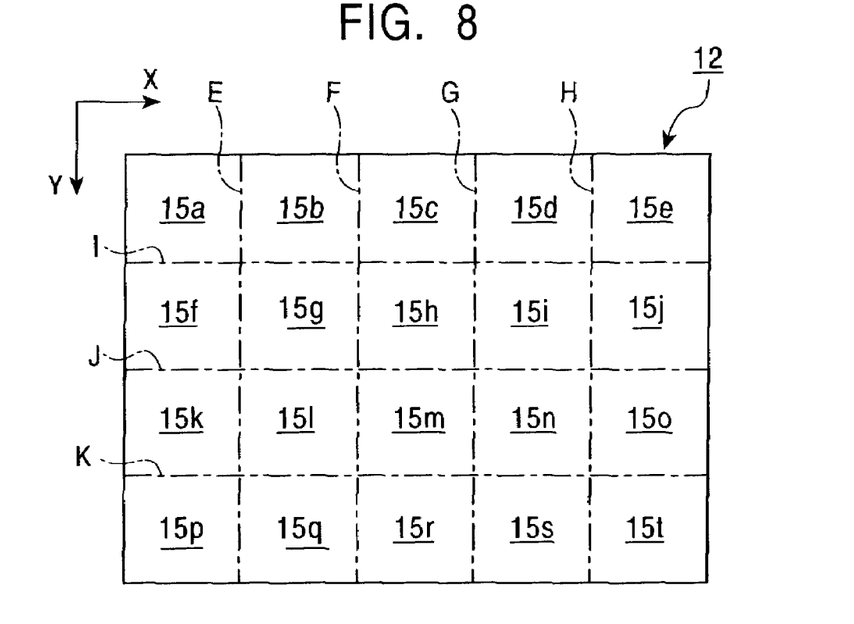
FIG. 8 is a plan view showing a second example of divided regions set in a coordinates input surface.

FIG. 8 shows a coordinates input surface 12, which is divided into twenty divided regions.

Referring to FIG. 8, the coordinates input surface 12 includes twenty divided regions 15a to 15t defined by boundaries E to K. The divided regions 15a to 15t may be equal in size, or, for example, the division may be such that divided regions 15g to 15i and 15l to 15n at the center are larger and the other divided regions are smaller.

In this modification, the divided regions 15g to 15i and 15l to 15n at the center will be referred to as central regions, and the other divided regions, located at a periphery of the coordinates input surface 12, will be referred to as peripheral regions.

The central regions 15g to 15i and 15l to 15n and the peripheral regions 15a to 15f, 15j, 15k, and 15o to 15t are defined by the boundaries E to K (shown in dotted-chain line). The boundaries E to H extend in Y direction in parallel to each other, and the boundaries I to K extend in X direction in parallel to each other. Each of the boundaries E to H crosses each of the boundaries I to K.

Furthermore, function switches are respectively allocated to the central and peripheral regions 15a to 15t.

Figure 9:
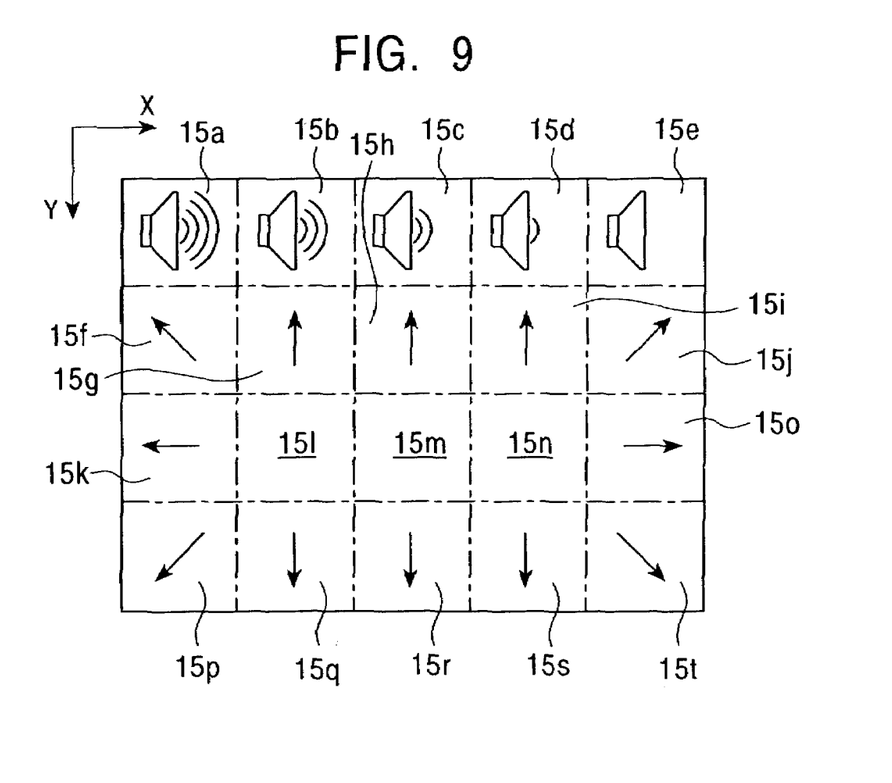
FIG. 9 is a plan view showing directions of movement of the cursor by function switches allocated to the divided regions in relation to the second example of divided regions set in the coordinates input surface.

For example, as shown in FIG. 9, switches for controlling volume of a media player or the like are allocated to the peripheral regions 15a to 15e. More specifically, a switch for maximizing the volume is allocated to the peripheral region 15a, and a sound-off switch is allocated to the peripheral region 15e. Furthermore, high volume, medium volume, and low volume switches are allocated to the peripheral regions 15b to 15d, respectively.

To the other central and peripheral regions 15f to 15t, function switches for controlling the cursor 4 on the screen 36' are respectively allocated.

Direction of movement of the cursor 4, associated respectively with the function switches allocated to the central and peripheral regions 15f to 15t, is diagonally toward the top left in the peripheral region 15f ; upward in the peripheral region 15f ; upward in the central regions 15g to 15i; diagonally toward the top right in the peripheral region 15j; leftward in the peripheral region 15k; rightward in the peripheral region 15o, diagonally toward the bottom left in the peripheral region 15p; downward in the peripheral regions 15q to 15s; and diagonally toward the bottom right in the peripheral region 15t. These directions of movement of the cursor 4 are indicated by arrows in the respective regions in FIG. 9.

In the central regions 15l to 15n, switches for deactivating functions associated with the function switches of the other regions are allocated. Thus, when the finger 3 is moved into one of the central regions 15l to 15n from one of the other regions, continuous movement of the cursor 4 is stopped, and when the finger 3 is then moved in the central regions 15l to 15n, the cursor 4 is moved in accordance with the movement of the finger 3, similarly to a known touch pad or the like.

Setting of operations for activating the function switches respectively allocated to the central and peripheral regions 15a to 15t, and setting of deactivating the functions associated with the function switches when the finger 3 is detached from the central and peripheral regions 15a to 15t are similar to the case of the coordinates input surface 2 described earlier.

For example, if the finger 3 is slid into the peripheral region 15a, the volume of the media player or the like is maximized. If the finger 3 is slid into the peripheral region 15g, the cursor 4 is continuously moved upward on the screen 36'.

Furthermore, when the finger 3 is moved in one of the central regions 15g to 15i and the peripheral regions 15k, 15o, and 15p to 15t in a direction that is different from the predetermined direction of movement of the cursor 4 in the relevant region, direction of movement of the cursor 4 is set to a combined direction of the predetermined direction of movement of the cursor 4 and the direction of movement of the finger 3, similarly to the case of the coordinates input surface 2.

The settings of the coordinates input surface 12 may be stored as a program in the ROM 37 of the coordinates output device PC, or may be stored as a device driver in the RAM 38.

According to the settings of the coordinates input surface 12 described above, similarly to the case of the coordinates input surface 2, functions of moving the cursor 4 in predetermined directions are respectively associated with the central regions 15g to 15i and the peripheral regions 15k, 15o, and 15p to 15t , so that the cursor 4 on the screen 36' can be moved in the predetermined directions as desired only by moving the finger 3 correspondingly to the central regions 15g to 15i and the peripheral regions 15k, 15o, and 15p to 15t.

Furthermore, according to the settings of the coordinates input surface 12, switches for controlling volume are allocated to the peripheral regions 15a to 15e, so that the volume can be controlled only by operating the coordinates input surface 12 by the finger 3.

Switches that are allocated to the peripheral regions 15a to 15e are not limited to switches for controlling volume, and switches for other purposes may be allocated, for example, a play switch, a stop switch, etc. of a media player. Furthermore, such switches may be allocated regions other than the peripheral regions 15a to 15e.

What is claimed is:

1. A coordinates input apparatus having a coordinates input surface that is operated by a coordinates pointer, a pointing mark on a screen being moved in accordance with operation of the coordinates pointer,
    wherein the coordinates input surface is divided by boundaries into at least nine divided regions, and a function switch is allocated to a respective region; and
    a predetermined function is associated with the function switch, the predetermined function is a function of moving the pointing mark in a predetermined direction and is executed when the coordinates pointer is moved from a first divided region to a second divided region across a boundary, wherein when the coordinates pointer is moved in a direction that is different from the predetermined direction in the second divided region, the pointing mark is moved in a direction that is a combination of the predetermined direction and the direction of movement of the coordinates pointer.

2. A coordinates input apparatus according to claim 1, wherein the predetermined function is deactivated when the coordinates pointer is detached from the second divided region.

3. A coordinates input apparatus according to claim 1, wherein the divided regions include a plurality of peripheral regions adjacent to a periphery of the coordinates input surface, and at least one central regions surrounded by the peripheral regions; and
    the function associated with the function switch of at least one of the peripheral regions is a function of moving the pointing mark in a predetermined direction.

4. A coordinates input apparatus according to claim 3, wherein when the coordinates pointer is moved in a direction that is different from the predetermined direction in the at least one of the peripheral regions, direction of movement of the pointing mark is set to a combined direction of the predetermined direction and the direction of movement of the coordinates pointer.

5. A coordinates input apparatus according to claim 1, wherein the function associated with the function switch of the second divided region is a function of coordinates output device.

6. A coordinates input apparatus having a coordinates input surface that is operated by a coordinates pointer, a pointing mark on a screen being moved in accordance with contacting movement of the coordinates pointer across the coordinates input surface;
    the coordinates input surface being divided by boundaries into at least nine divided regions, a function switch being associated with at least one of the divided regions;
    a first divided region having a function switch adapted to allow an operator to control movement of the pointing mark on a screen, wherein contacting movement of the coordinates pointer across the coordinates input surface results in corresponding movement of the pointing mark on the screen;
    a second divided region having a function switch adapted to maintain movement of the pointing mark in a predetermined direction once the coordinates pointer moves onto the coordinates input surface within that particular divided region, wherein movement of the pointing mark is maintained in the predetermined direction until the coordinates pointer is removed from the coordinates input surface within that particular divided region, and wherein when the coordinates pointer is moved in a direction that is different from the predetermined direction in the second divided region, the pointing mark is moved in a direction that is a combination of the predetermined direction and the direction of movement of the coordinates pointer.

7. A coordinates input apparatus according to claim 6, at least one central region positioned centrally within the coordinates input surface and having a function switch adapted allow an operator to control movement of the pointing mark on a screen, wherein contacting movement of the coordinates pointer across the coordinates input surface results in corresponding movement of the pointing mark on the screen;

a plurality of peripheral regions positioned adjacent to and extending around the central region, the peripheral regions having a function switch adapted to maintain movement of the pointing mark in a predetermined direction once the coordinates pointer moves onto the coordinates input surface within that particular region, wherein movement of the pointing mark is maintained in the predetermined direction until the coordinates pointer is removed from the coordinates input surface within that particular peripheral region.

8. A coordinates input apparatus according to claim 7, wherein when the coordinates pointer is moved in a direction that is different from the predetermined direction in a particular peripheral region, the pointing mark is moved in a direction that is a combination of the predetermined direction and the direction of movement of the coordinates pointer.

9. A coordinates input apparatus according to claim 6, wherein at least one divided region has a function switch that is a coordinates output device.

10. A coordinates input apparatus having a coordinates input surface that is operated by a coordinates pointer, a pointing mark on a screen being moved in accordance with contacting movement of the coordinates pointer across the coordinates input surface;

the coordinates input surface being divided by boundaries into at least nine divided regions, a function switch being associated with at least one of the divided regions;

at least one divided region having a function switch adapted to allow an operator to control movement of the pointing mark on a screen, wherein contacting movement of the coordinates pointer across the coordinates input surface results in corresponding movement of the pointing mark on the screen;

at least one divided region having a function switch adapted to maintain movement of the pointing mark in a predetermined direction once the coordinates pointer moves onto the coordinates input surface within that particular divided region, wherein movement of the pointing mark is maintained in the predetermined direction until the coordinates pointer is removed from the coordinates input surface within that particular divided region, and wherein the predetermined direction is a function of a location of the particular divided region relative to another divided region;

at least one central region positioned centrally within the coordinates input surface and having a function switch adapted allow an operator to control movement of the pointing mark on a screen, wherein contacting movement of the coordinates pointer across the coordinates input surface results in corresponding movement of the pointing mark on the screen;

a plurality of peripheral regions positioned adjacent to and extending around the central region, the peripheral regions having a function switch adapted to maintain movement of the pointing mark in a predetermined direction once the coordinates pointer moves onto the coordinates input surface within that particular region, wherein movement of the pointing mark is maintained in the predetermined direction until the coordinates pointer is removed from the coordinates input surface within that particular peripheral region; and, wherein when the coordinates pointer is moved in a direction that is different from the predetermined direction in a particular peripheral region, the pointing mark is moved in a direction that is a combination of the predetermined direction and the direction of movement of the coordinates pointer.

* * * * *